Nov. 26, 1968   J. P. LAIKAM   3,412,840
APPARATUS FOR PICKING UP BUNDLES
Filed July 29, 1966   2 Sheets-Sheet 1
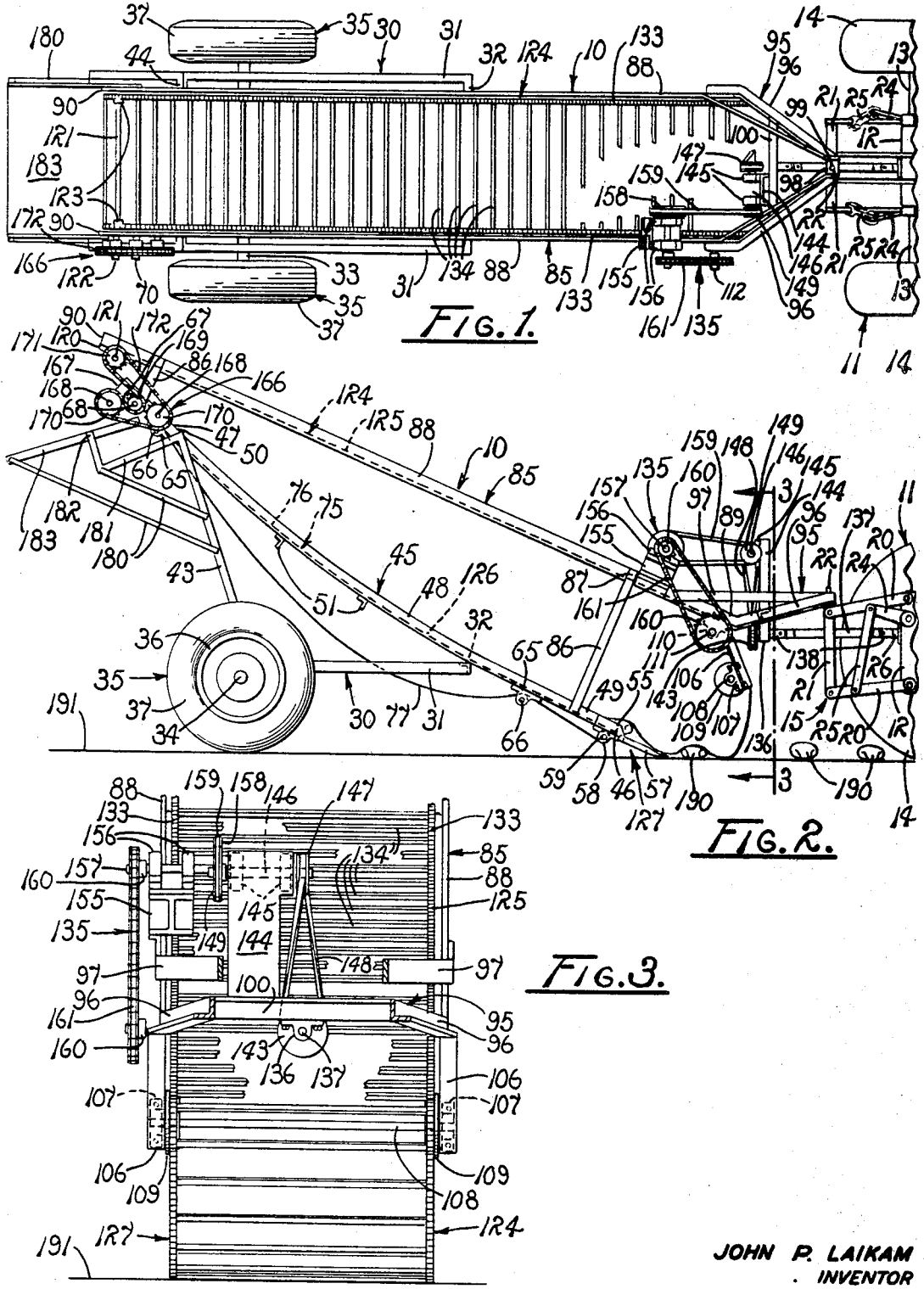
JOHN P. LAIKAM
INVENTOR
ATTORNEYS Nov. 26, 1968  J. P. LAIKAM  3,412,840

APPARATUS FOR PICKING UP BUNDLES

Filed July 29, 1966  2 Sheets-Sheet 2

JOHN P. LAIKAM
INVENTOR

Huebner & Worrel
ATTORNEYS

United States Patent Office 3,412,840
Patented Nov. 26, 1968

3,412,840
APPARATUS FOR PICKING UP BUNDLES
John P. Laikam, 8692 E. South Ave.,
Fowler, Calif. 93625
Filed July 29, 1966, Ser. No. 568,969
9 Claims. (Cl. 198—8)

ABSTRACT OF THE DISCLOSURE

Apparatus including a wheeled vehicle having an inclined frame carrying inclined fingers at the forward end thereof and supporting a pair of endless conveyors, one superimposed on the other and having a lower run engaging the upper run of the other and extending forwardly thereof ahead of the inclined fingers for engaging bundles on a supporting surface and holding them for retrieval and eventual conveying between the conveyors which are driven at the same speed as the travel of the vehicle over the supporting surface.

---

The present invention relates to an apparatus for picking up bundles and more particularly to such an apparatus adapted to pick up and to convey to a discharge point, bundles of various sizes and shapes as the apparatus travels along a row of such bundles. Although designed to be used in picking up successive bundles of raisins rolled in paper trays, the apparatus is not restricted to such use.

In the making of raisins, bunches of grapes are picked from their vines and placed on paper trays, which are aligned in rows between rows of the grapevines. The grapes are allowed to dry in the sunlight to produce raisins. After the grapes have dried, each tray having raisins thereon is rolled into a bundle and the raisins permitted to cure while confined by the tray. Conventionally, when the trays are rolled they are placed to one side of a driveway running between their respectively adjacent pair of rows of grapevines so that a tractor and wagon or vineyard truck can pass therealong. Subsequently, the bundles of raisins are manually loaded onto such a wagon or vineyard truck. These manual operations of moving the bundles to a side of each driveway and then lifting and stacking or boxing the bundles on the wagon are time consuming, physically exhausting and expensive of labor.

Therefore, it is an object of the present invention to provide an apparatus for automatically picking up bundles and conveying them to a position for discharge therefrom.

Another object is to provide such an apparatus which eliminates the need for manual repositioning and loading of the bundles of raisins.

Another object is to provide such an apparatus which can automatically pick up and convey bundles of a variety of shapes and sizes.

Another object is to provide an apparatus for picking up bundles which minimizes the disturbing thereof during such operation.

Another object is to provide an apparatus for picking up bundles which is narrow enough easily to be drawn between adjacent rows of grapevines.

A further object is to provide an apparatus for picking up bundles which is relatively simple and inexpensive to construct and to operate.

Still further objects of the present invention are to provide improved elements and arrangements thereof in an apparatus for the purposes set forth which is fully effective in achieving its intended functions.

These, together with other objects and advantages of the present invention, will become more fully apparent upon reference to the following description in the specification and accompanying drawings.

In the drawings:

FIG. 1 is a top view of the device of the present invention operably connected to the rear end of a tractor which is fragmentarily represented.

FIG. 2 is a side elevation of the device of the present invention operably connected to the rear end of the tractor shown with a rear wheel removed for illustrative convenience.

FIG. 3 is a somewhat enlarged fragmentary transverse vertical section through the device, taken on line 3—3 of FIG. 2 showing a portion of its driving assembly in front elevation.

Figure 4:
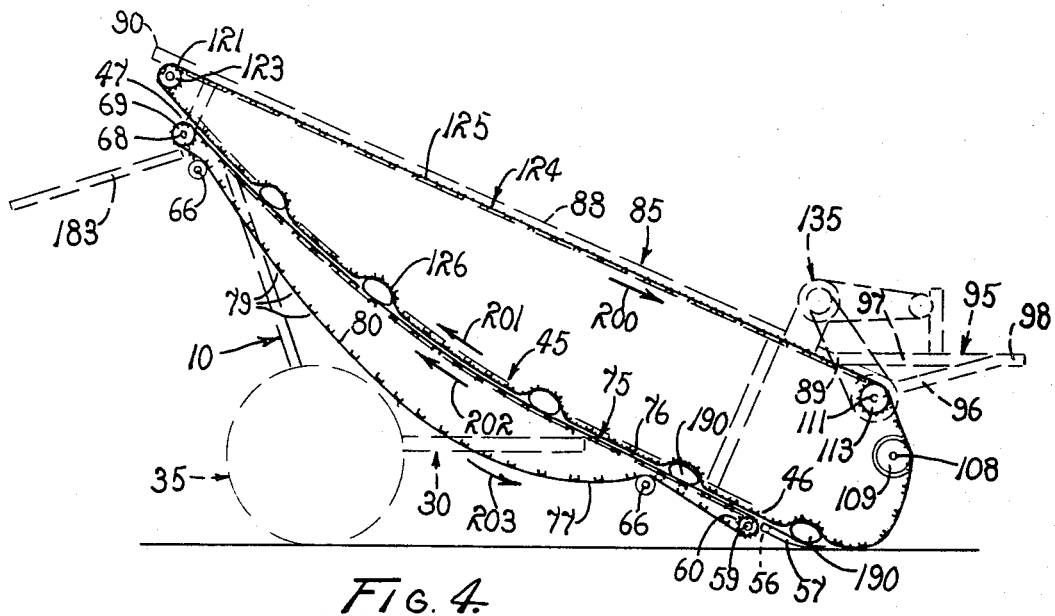
FIG. 4 is a phantom side elevation of the apparatus of the present invention showing the positions of its conveyor belts relative to each other.

Referring in greater particularity to the drawings, an apparatus embodying the principles of the present invention is generally indicated by the numeral 10. The apparatus is designed to be pulled in trailing relation behind a conventional tractor 11. The tractor provides a differential housing 12 through which is horizontally mounted a rear axle 13. A pair of rear tractor wheels 14 are individually affixed on the opposite distal ends of the rear axle. A conventional A-frame 15 is adjustably mounted on the rear housing of the tractor. The A-frame has two pairs of pivot arms 20 which are pivotally mounted on the rear housing. A pair of angulated connecting arms 21 connect the distal ends of the pivot arms. A conventional trailer hitch bar 22, having a link hole therein, is provided at the upwardmost ends of the connecting arms. A pair of powdered lever arms 24 are individually mounted on the rear housing. A pair of linking arms 25 individually connect the distal ends of the lever arms with the lower pivot arms. A motor driven auxiliary drive shaft 26 extends longitudinally out of the rear housing of the tractor.

The apparatus 10 provides a vehicular frame 30 which has a pair of parallel angle-iron frame members 31. A crossbar 32 is weldably mounted between and normal to one pair of adjacent ends of the frame members. A trailer axle 33 is weldably mounted between and normal to the opposite pair of adjacent ends of the frame members. A wheel journal 34 is provided at each end of the trailer axle in alignment therewith. A pair of wheels 35 are individually, rotatably mounted on the journals in the conventional manner. Each wheel provides a hub 36 with an inflatable rubber tire 37 mounted circumferentially about it. A pair of parallel angle-iron conveyor supports 43 are weldably affixed on the trailer axle individually in alignment with but at an upwardly extended angle to the frame members. A pair of connecting pieces 44 are individually mounted on the upwardly extending ends of the conveyor supports extending inwardly toward each other, as shown in FIG. 1. The crossbar is at the forward end of the vehicular frame and the connecting pieces are at the rearward end of the vehicular frame.

An upwardly, arcuately curving lower conveyor structure 45 is weldably mounted on the vehicular frame 30. The lower conveyor structure has a receiving end 46 which extends forwardly of and below the crossbar 32 of the vehicular frame and a discharging end 47 which extends slightly rearwardly of and above the connecting pieces 44. The lower conveyor structure provides a pair of parallel angle-iron lower guides 48 having forward ends 49 and rearward ends 50. The lower guides are weldably mounted at their forwardly extending ends on the crossbar and at their rearwardly extending ends individually on their respective connecting pieces. Several spacers 51 are affixed on the lower guides to maintain the structural rigidity of the lower conveyor structure.

A pair of extension plates 55 are individually mounted on the forward ends 49 of the lower guides 48 and extended a short distance forwardly therefrom. A finger bar 56 is affixed between the extension plates normal to the lower guides, a spaced predetermined distance therefrom. A plurality of parallel ground engaging fingers 57 are mounted on the finger bar and extend forwardly therefrom and normal thereto.

A pair of shaft bearings 58 are individually mounted below the extension plates 55 and define an axis which runs between and slightly below the forward ends 49 of the lower guides 48 and the finger bar 56. A forward mounting shaft 59 is rotatably mounted in and between the shaft bearings parallel to the finger bar. A pair of forward sprockets 60 are affixed about the forward mounting shaft in alignment with the lower guides. Two pairs of support shaft mounts 65 are affixed on the lower guides in spaced relation in the positions shown in FIG. 2. Each pair of support shaft mounts is in transverse alignment with respect to the apparatus 10, one support shaft mount of each pair being affixed on each lower guide. A pair of support shafts 66 are individually, rotatably mounted in their respective pair of support shaft mounts normal to and slightly below the lower guides. A pair of bearing brackets 67 are individually affixed on the rearward ends 50 of the lower guides and extended a short distance rearwardly of and below the lower guides. A conveyor drive shaft 68 is rotatably mounted in the bearing brackets normal to the lower guides. A pair of drive sprockets 69 are individually mounted about the conveyor drive shaft in alignment with the rearward ends 50 of the lower guides. An end 70 of the conveyor drive shaft extends laterally of the apparatus a short distance, as best shown in FIG. 1.

A lower or primary conveyor belt 75, having an upper run 76 and a lower run 77, is mounted about the forward mounting shaft 59 and the conveyor drive shaft 68 so that the upper run rests on the lower guides 48 and the lower run rests on each of the support shafts 66. The lower conveyor belt is relatively long in length so that the lower run of the conveyor belt droops or is slackened between the support shafts as best shown in FIGS. 2 and 4. The lower conveyor belt has a pair of spaced drive chains 78 which mesh individually with the forward sprockets 60 and with the drive sprockets 69. A plurality of equally spaced flight bars or conveyor slats 79 are affixed between and normal to the drive chains throughout the entire length of the conveyor belt. A sheet 80 of any suitable material such as canvas is adhesively mounted circumferentially about the peripheral surface formed by the drive chains and conveyor slats.

An upper conveyor structure 85 is mounted above the lower conveyor structure 45. The upper conveyor structure has two pairs of supporting legs 86 which are mounted, as best shown in FIG. 2. The supporting legs have upward ends 87. A pair of angle-iron upper guides 88 are individually mounted, as by welding, in spaced parallel relation on their respective upward ends of the support legs in respective alignment with the lower guides 48. The upper guides have forward ends 89 and rearward ends 90 which extend predetermined distances in their respective directions.

A connection structure 95 is mounted on the forward ends 89 of the upper guides 88. The connection structure provides a pair of angle-iron bars 96 which are individually, weldably secured to the forward ends of the upper guides and extend forwardly and converge in a slightly upward direction. A pair of support straps 97 are individually, weldably affixed to the upper guides rearwardly of the angle-iron bars. The straps are individually welded to the forwardly extending ends of the angle-iron bars. A hitch plate 98 is horizontally mounted between the forwardly extending ends of the angle-iron bars and provides a hitch hole 99 therein. An angle-iron brace 100 is affixed, as by welding, between the angle-iron bars normal to the upper guides.

A pair of idler extensions 106 are individually mounted on the forward ends 89 of the upper guides 88 and extend downwardly and slightly forwardly therefrom. A pair of bearing mounts 107 are individually affixed on the downwardly extending ends of the idler extensions, as shown in FIG. 2. An idler shaft 108 is rotatably mounted in the bearing mounts normal to the upper guides. A pair of idler pulleys 109 are affixed about the idler shaft in individual alignment with the upper guides. A pair of shaft bearings 110 are individually mounted on the forward ends of the upper guides as shown in dashed lines in FIG. 2. A conveyor drive shaft 111 is rotatably mounted in the shaft bearings parallel to the idler shaft and provides an end 112 which extends laterally of the apparatus 10, as best shown in FIG. 1. A pair of drive sprockets 113 are affixed about the drive shaft in individual alignment with the upper guides. A pair of shaft bearings 120 are individually affixed to the rearward ends 90 of the upper guides. A rearward mounting shaft 121 is rotatably positioned in the shaft bearings normal to the upper guides and has an end 122 extending a short distance to the same side of the apparatus as the ends 70 and 112. A pair of rearward sprockets 123 are mounted on the rearward mounting shaft in individual alignment with the rearward ends of the upper guides.

An upper or auxiliary conveyor belt 124 of relatively long length, having an upper run 125 and a lower run 126, is mounted about conveyor drive shaft 111, idler shaft 108, and rearward mounting shaft 121 with the upper run resting on the upper guides 88 and the lower run resting on the upper run 76 of lower conveyor belt 75. The upper conveyor belt is of a length in relation to the upper conveyor structure 85 such that it rests gravitationally on the upper run of the lower conveyor and is draped or drooped forwardly of the fingers 57 below the idler pulleys 109. The forward portion of the lower run of the upper conveyor belt and the fingers make up a retrieving mechanism 127. The upper conveyor belt has a pair of spaced drive chains 133 which mesh individually with the drive sprockets 113 and individually with the rearward sprockets 123. A plurality of equally spaced flight bars or slats 134 are affixed between and normal to the drive chains throughout the entire length of the upper conveyor belt. The lower conveyor belt and upper conveyor belt form a bundle or article conveyor.

An upper conveyor driving assembly 135 is mounted on the connection structure 95 and on the forward end 89 of the upper guide 88 which is on the same side of the apparatus 10 as the ends of the shafts 70, 112, and 122. The driving assembly provides a drive shaft bearing 136 which is affixed centrally below the angle-iron brace 100 of the connection structure. An apparatus drive shaft 137, having universal joints 138, is rotatably mounted in the drive shaft bearing so that one end thereof extends out of the bearing a short distance toward the apparatus. A drive pulley 143 is affixed on the end of the apparatus drive shaft which is nearest to the apparatus.

A pulley plate 144 is mounted above the angle-iron brace 100 to the left of the drive shaft bearing 136, as viewed in FIG. 3. A pair of transfer shaft bearings 145 are affixed on the upper portion of the pulley plate facing and defining an axis normal to the upper guides 88. A transfer shaft 146 is rotatably mounted in transfer shaft bearings and extends a short distance on both sides of the pulley plate. A first transfer pulley 147 is affixed to an end of the transfer shaft in alignment with the apparatus drive shaft. A drive belt 148 is positioned in driving relation about the drive pulley 143 and the first transfer pulley, as best shown in FIG. 3. A second transfer pulley 149 is affixed to the end of the transfer shaft opposite to that having the first transfer pulley.

An I-block 155 is mounted, as by welding, on the upper guide 88 on the left, as viewed in FIG. 3, near its forward end 89. A pair of connection shaft bearings 156 are affixed on the I-block and define an axis normal to the upper guides 88. A connection shaft 157 is rotatably mounted in the connection shaft bearings and extends a predetermined distance on both sides of the I-block. A relatively large connection pulley 158 is mounted on an end of the connection shaft in alignment with the second transfer pulley 149. A connection belt 159 is positioned in driving relation about the connection pulley and the second transfer pulley, as shown in FIGS. 1, 2, and 3. A pair of drive sprockets 160 are individually affixed in alignment on the end 112 of the conveyor drive shaft 111 and on the end of the connection shaft opposite that having the connection pulley thereon. A drive chain 161 is positioned in driving relation about the drive sprockets 160, as best shown in FIG. 2.

A lower conveyor driving assembly 166 is mounted on the lower guide 48 and the upper guide 88 which are on the same side of the apparatus 10 as the ends of the shafts 70, 112, and 122. The lower conveyor driving assembly provides a spindle bracket 167 which is mounted on the rearward end 50 of the lower guide. A pair of pivot spindles 168 are mounted on the lower guide parallel to and on opposite sides of the end 70 of the conveyor drive shaft 68, as shown best in FIG. 2. A drive sprocket 169 is mounted on the end 70 of the conveyor drive shaft 68. A pair of sprocket wheels 170 are individually rotatably mounted on the pivot spindles in alignment with the drive sprocket 169. A drive sprocket wheel 171 is mounted on the end 122 of the rearward mounting shaft 121 in alignment with the drive sprocket, and the sprocket wheels. A drive chain 172 is positioned in driving relation about the drive sprocket wheel, drive sprocket, and the sprocket wheeyls, as best shown in FIG. 2.

Two pairs of support arms 180 are mounted on the conveyor supports 43 and extend rearwardly of the apparatus 10 at a slightly inclined angle. A pair of chute mounting bars 181, having upwardly extending ends 182, are individually mounted on upwardly extending ends of the conveyor supports and are also individually mounted on a pair of support arms, as shown in FIG. 2. A bundle chute 183 is affixed to the ends 182 of the mounting bars and the upwardly extending ends of the other pair of support arms in the position best shown in FIG. 2 below the discharging end 47 of lower conveyor structure 45.

*Operation*

Figure 5:
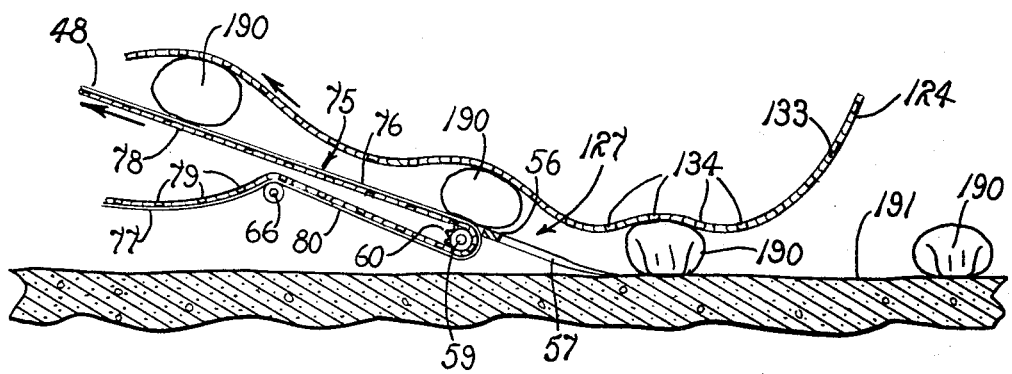
FIG. 5 is an enlarged fragmentary side elevation of a lower ground engaging portion of the apparatus showing bundles being picked up by fingers and then rolled onto a lower conveyor belt by an upper conveyor belt.

The operation of the described embodiment of the subject invention is believed to be readily apparent and is briefly summarized at this point. As previously discussed, freshly picked grapes are laid out to dry in the sunlight on paper trays forming rows between each adjacent pair of rows of grapevines, not shown. When these grapes have been dried into raisins, each tray of raisins is rolled into a bundle thus forming a row of bundles. Bundles of raisins 190 are shown resting on the surface of the ground 191 in a row in FIGS. 2, 4, and 5. Conventionally, these bundles of raisins must be moved to new positions next to either of the rows of grapevines and then loaded by hand onto a vineyard truck down by tractor between the rows. However, with the device of the present invention, the bundles of raisins are left in their curing positions.

To pick up the bundles, the apparatus 10 is connected to the rear of a tractor 11. This is accomplished by aligning the apparatus rearwardly of the tractor and having the link hole of the trailer hitch bar 22 positioned below the hitch hole 99 of the connection structure 95 of the apparatus. Any conventional pin is received through the aligned link hole and hitch hole to hold the apparatus in connection with the tractor. The end of the drive shaft 137 opposite that having drive pulley 143 thereon is releasably connnected, by any suitable means, in driving relation to the auxiliary drive shaft 26 of the tractor, as shown in FIGS. 1 and 2. By raising the A-fame of the tractor in the conventional manner using lever arms 24, the receiving end 46 of the apparatus can be lifted so that the retrieving mechanism 127 is off the ground. In this relationship, the apparatus can more easily be towed along a road or driveway to the desired position between two rows of grapevines in alignment with the row of bundles of raisins for the bundle retrieving operation. The A-frame is, then, lowered in the conventional manner until the apparatus is in the position shown best in FIG. 2 with the retrieving mechanism contacting the surface of the ground. The auxiliary drive shaft 26 is, then, operated to rotate the apparatus drive shaft 137. Consequently, the upper conveyor belt 124 is driven to travel on the upper conveyor structure in the direction indicated by arrows 200 and 201 in FIG. 4 by means of the upper conveyor driving assembly being in operable connection with the apparatus drive shaft 137 and the upper conveyor drive shaft 111. The lower conveyor belt 75 is driven to travel about the lower conveyor structure 45 in the direction indicated by arrows 202 and 203 in FIG. 4. This occurs by means of the lower conveyor driving assembly 166 being in operable connection with upper conveyor mounting sraft 121 and in connection with lower conveyor drive shaft 68. The upper and lower conveyor belts are driven to travel at approximately ground speed.

The tractor 10 is then driven along the row of bundles of raisins 190 in straddling relation thereto. The retrieving mechanism 127 which is in contacting relation to the surface of the ground 191 is in precise alignment with the row of bundles of raisins. As the forward portion of the lower run 126 of the upper conveyor belt 124 comes into contact with each successive bundle of raisins, it rests thereon, holding it firmly in position for the fingers 57. The fingers, then, slide under the underside of each bundle of raisins and the upper conveyor belt rolls it up onto the fingers. Subsequently, each bundle of raisins is rolled by the upper conveyor belt onto the receiving end 46 of the lower conveyor belt 75. Since the lower run of the upper conveyor belt rests on and travels in the same direction as the upper run of the lower conveyor belt, and since they both are driven to travel at approximately ground speed, the bundles of raisins are held firmly between the conveyor belts and are transported to the discharging end 47 of the lower conveyor belt. Finally, the bundles of raisins are individually dropped from the lower conveyor belt onto the bundle chute 183 on which each bundle slides downwardly therefrom and onto any appropriate vehicle such as a vineyard truck, not shown, pulled behind the apparatus for raisin boxing purposes.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An apparatus for picking up articles which are aligned in a row on a support surface, comprising a vehicle; an article conveyor mounted on the vehicle, having receiving and discharging ends; an article retrieving mechanism provided in transfering relation to the receiving end of the article conveyor; and drive means in operable connection with the vehicle, the article conveyor, and the article retrieving mechanism to move the vehicle along said row and to operate the retrieving mechanism to pick up successive articles in the row and transfer them to the receiving end of the article conveyor which in turn is operated by the drive means to deliver said articles to its discharging end, said article retrieving mechanism including support surface engaging fingers and an upper conveyor having a lower run which is driven by the drive means to hold each successive article unto the fingers and thence onto the receiving end of the article conveyor for delivery to the discharge end of the article conveyor, said upper conveyor having a lower run which is driven by the drive means in the same direction and at the same speed as the article conveyor and said lower run rests on the article conveyor, on the fingers and on the support surface forwardly of the fingers so that the lower run rests on and holds each successive article for retrieval by the fingers and thence onto the article conveyor where it is held during delivery to the discharging end of the article conveyor.

2. An apparatus for picking up objects disposed substantially in a row on a support surface comprising a vehicle adapted to move along the row, a primary conveyor mounted on the vehicle having predetermined reception and discharge ends and an upper run, the reception end being disposed adjacent to said support surface, an auxiliary conveyor mounted on the vehicle having a lower run disposed above the primary conveyor and extended from the reception end thereof for gravitationally rested support on said objects on the support surface and on said primary conveyor, and drive means connected to said conveyors synchronously driving the primary conveyor with the upper run thereof and the auxiliary conveyor with the lower run thereof driven toward the discharge end of the primary conveyor and at substantially the same speed.

3. The apparatus of claim 2 in which the primary conveyor comprises an endless belt with the upper run thereof inclined in the vehicle in the direction opposite to that which the vehicle moves along the row; and the auxiliary conveyor comprises a pair of substantially endless flexible members, and a plurality of substantially parallel flight bars interconnecting the flexible members in spaced relation transversely disposed to the primary conveyor.

4. The apparatus of claim 2 including synchronous means for motivating the vehicle along the row at a support surface traversing speed substantially equal to the speed of the upper run of the primary conveyor and the lower run of the auxiliary conveyor and in the opposite direction.

5. The apparatus of claim 2 in which the vehicle provides an upper conveyor support structure above the primary conveyor; said auxiliary conveyor being mounted on the support structure; and said auxiliary conveyor being of sufficiently greater length than the upper conveyor structure whereby the lower run of the auxiliary conveyor rests gravitationally on said objects immediately in the path of the primary conveyor and on the upper run of the primary conveyor so that, as said drive means synchronously travels the primary and auxiliary conveyors, the objects are successively drawn onto the primary conveyor at the reception end of the vehicle and subsequently delivered on the primary conveyor to the discharge end of the vehicle.

6. An apparatus for picking up articles from a support surface comprising a vehicle supported for movement on the support surface, a first conveyor mounted on said vehicle and having an article engaging portion driven at a predetermined speed, and a second conveyor mounted on said vehicle in superposed relation to said first conveyor and having an article engaging portion driven at substantially the same speed as said article engaging portion of said first conveyor, at least a portion of one of said article engaging portions being in facing relation to and coextensive with the other of said article engaging portions, said article engaging portions being driven in the same direction for holding articles therebetween and conveying the same, and at least one of the conveyors having a portion extending loosely beyond the other conveyor and thereby engaging the articles and the support surface.

7. The apparatus of claim 6 wherein said conveyors are inclined with respect to said support surface, one of said conveyors having a lower run constituting one of said article engaging portions and driven adjacent to the lower end thereof to provide a drooping upwardly driven lower run disposed beyond the other of said article engaging portions and gravitationally engaging said articles while they are on said support surface.

8. The apparatus of claim 7 wherein inclined fingers engaging said support surface cooperate with said drooping run for retrieving said articles from the support surface and directing them to the facing coextensive portions of said article engaging portions.

9. The apparatus of claim 7 wherein said vehicle is moved over said support surface at substantially the same speed at which said article engaging portions of said conveyors are driven.

References Cited

UNITED STATES PATENTS

| 142,234 | 8/1873 | Howland | 198—165 X |
| 1,722,932 | 7/1929 | Mandel | 171—101 |
| 2,599,715 | 6/1952 | Lepper | 56—328 |
| 2,679,133 | 5/1954 | Soderholm | 56—328 |

EDWARD A. SROKA, *Primary Examiner.*